(12) United States Patent
Romoser

(10) Patent No.: US 11,944,034 B2
(45) Date of Patent: Apr. 2, 2024

(54) AGRICULTURAL HARVESTER WITH PROACTIVE RESPONSE TO MOISTURE LEVEL OF COLLECTED CROP MATERIAL

(71) Applicant: CNH Industrial America LLC, New Holland, PA (US)

(72) Inventor: Tyler J. Romoser, Keota, IA (US)

(73) Assignee: CNH Industrial America LLC, New Holland, PA (US)

(*) Notice: Subject to any disclaimer, the term of this patent is extended or adjusted under 35 U.S.C. 154(b) by 707 days.

(21) Appl. No.: 16/685,636

(22) Filed: Nov. 15, 2019

(65) Prior Publication Data

US 2021/0144919 A1 May 20, 2021

(51) Int. Cl.
*A01D 41/127* (2006.01)
*A01F 12/46* (2006.01)

(52) U.S. Cl.
CPC ..... *A01D 41/1271* (2013.01); *A01D 41/1274* (2013.01); *A01D 41/1277* (2013.01); *A01F 12/46* (2013.01)

(58) Field of Classification Search
CPC ............ A01D 41/1271; A01D 41/1274; A01D 41/1277; A01D 41/127; A01F 12/46
See application file for complete search history.

(56) References Cited

U.S. PATENT DOCUMENTS

| | | | |
|---|---|---|---|
| 3,606,742 A | 9/1971 | Wienkeke et al. | |
| 4,337,611 A * | 7/1982 | Mailander | A01D 41/1274 460/7 |
| 5,092,819 A * | 3/1992 | Schroeder | A01D 41/1277 460/7 |
| 5,947,818 A * | 9/1999 | Satzler | A01D 69/06 56/10.2 G |
| 6,073,428 A * | 6/2000 | Diekhans | B60K 25/00 123/352 |
| 6,119,442 A * | 9/2000 | Hale | A01D 41/127 56/10.2 H |
| 6,185,990 B1 | 2/2001 | Missotten et al. | |

(Continued)

FOREIGN PATENT DOCUMENTS

| | | | |
|---|---|---|---|
| DE | 19924304 A1 * | 12/1999 | A01D 69/005 |
| EP | 1243173 A1 | 9/2002 | |

(Continued)

OTHER PUBLICATIONS

Extended European Search Report for EP Application No. 20207788.9 dated Apr. 13, 2021 (six pages).

*Primary Examiner* — Alicia Torres
(74) *Attorney, Agent, or Firm* — Peter K. Zacharias

(57) ABSTRACT

An agricultural harvester includes: a chassis; a threshing and separation system including at least one concave carried by the chassis, the threshing and separation system being configured to thresh and separate a flow of crop material; and a controller carried by the chassis. The controller is configured to: operably couple to a moisture sensor disposed upstream of the threshing and separation system, relative to the flow of crop material; determine a moisture level of crop material headed for the threshing and separation system; and output an adjustment signal to at least one component of the agricultural harvester to adjust performance of the threshing and separation system based at least partially on the determined moisture level.

13 Claims, 2 Drawing Sheets

(56) References Cited

U.S. PATENT DOCUMENTS

| | | | |
|---|---|---|---|
| 6,205,384 B1 * | 3/2001 | Diekhans | A01D 41/127 172/4.5 |
| 6,213,870 B1 | 4/2001 | Satzler | |
| 6,487,836 B1 * | 12/2002 | Coers | A01D 41/1271 460/7 |
| 6,584,390 B2 * | 6/2003 | Beck | A01D 41/127 172/4.5 |
| 6,726,559 B2 * | 4/2004 | Bischoff | A01D 41/127 460/1 |
| 6,863,604 B2 * | 3/2005 | Behnke | A01D 41/127 460/6 |
| 6,951,514 B1 | 10/2005 | Coers et al. | |
| 8,807,023 B2 * | 8/2014 | Biziorek | A01F 15/085 100/88 |
| 9,795,082 B2 | 10/2017 | Middelberg et al. | |
| 9,826,682 B2 | 11/2017 | Blank et al. | |
| 10,064,333 B2 * | 9/2018 | Duquesne | A01F 7/062 |
| 10,154,625 B2 | 12/2018 | Walker | |
| 10,426,093 B2 * | 10/2019 | Isaac | A01F 7/067 |
| 2010/0010713 A1 * | 1/2010 | Sheidler | A01D 41/127 701/50 |
| 2011/0320087 A1 | 12/2011 | Farley et al. | |
| 2014/0277961 A1 * | 9/2014 | Blank | G05B 13/0275 701/50 |
| 2018/0084721 A1 | 3/2018 | Walker | |
| 2018/0139902 A1 | 5/2018 | Walker et al. | |
| 2018/0235151 A1 * | 8/2018 | Isaac | A01F 7/067 |
| 2019/0104681 A1 * | 4/2019 | Larson | A01F 12/18 |

FOREIGN PATENT DOCUMENTS

| | | | |
|---|---|---|---|
| EP | 1525787 B1 * | 3/2010 | A01D 43/085 |
| EP | 2781147 A1 | 9/2014 | |

* cited by examiner

AGRICULTURAL HARVESTER WITH PROACTIVE RESPONSE TO MOISTURE LEVEL OF COLLECTED CROP MATERIAL

BACKGROUND OF THE INVENTION

The present invention pertains to agricultural vehicles and, more specifically, to agricultural harvesters.

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan or auger bed. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separation system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan or auger bed where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

It is known that crop collection and handling performance is affected by the moisture content of the collected crop material. Wet crop material, for example, is heavier and requires more power to process than dry crop material. Various ways of measuring crop moisture content have been developed, but the effects of differing crop moisture content, especially within a single field, on machine performance still have not been adequately addressed.

What is needed in the art is an agricultural harvester than can address at least some of the previously described issues with known agricultural harvesters.

SUMMARY OF THE INVENTION

Exemplary embodiments disclosed herein provide an agricultural harvester with a controller that determines a moisture level of crop material headed for a threshing and separation system and outputs an adjustment signal to adjust performance of the threshing and separation system based at least partially on the determined moisture level.

In some exemplary embodiments provided according to the present disclosure, an agricultural harvester includes: a chassis; a threshing and separation system including at least one concave carried by the chassis, the threshing and separation system being configured to thresh and separate a flow of crop material; and a controller carried by the chassis. The controller is configured to: operably couple to a moisture sensor disposed upstream of the threshing and separation system, relative to the flow of crop material; determine a moisture level of crop material headed for the threshing and separation system; and output an adjustment signal to at least one component of the agricultural harvester to adjust performance of the threshing and separation system based at least partially on the determined moisture level.

In some exemplary embodiments, a method of adjusting threshing and separation performance of a threshing and separation system of an agricultural harvester is provided. The method is performed by a controller coupled to a moisture sensor and includes: determining a moisture level of crop material headed for the threshing and separation system; and outputting an adjustment signal to at least one component of the agricultural harvester to adjust performance of the threshing and separation system based at least partially on the determined moisture level.

One possible advantage that may be realized by exemplary embodiments provided according to the present disclosure is that performance of the threshing and separation system can be proactively adjusted prior to processing crop material of differing moisture levels.

Another possible advantage that may be realized by exemplary embodiments provided according to the present disclosure is that output of an engine of the harvester can be increased in anticipation of processing wet crop material so the threshing and separation system does not get overwhelmed during processing.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
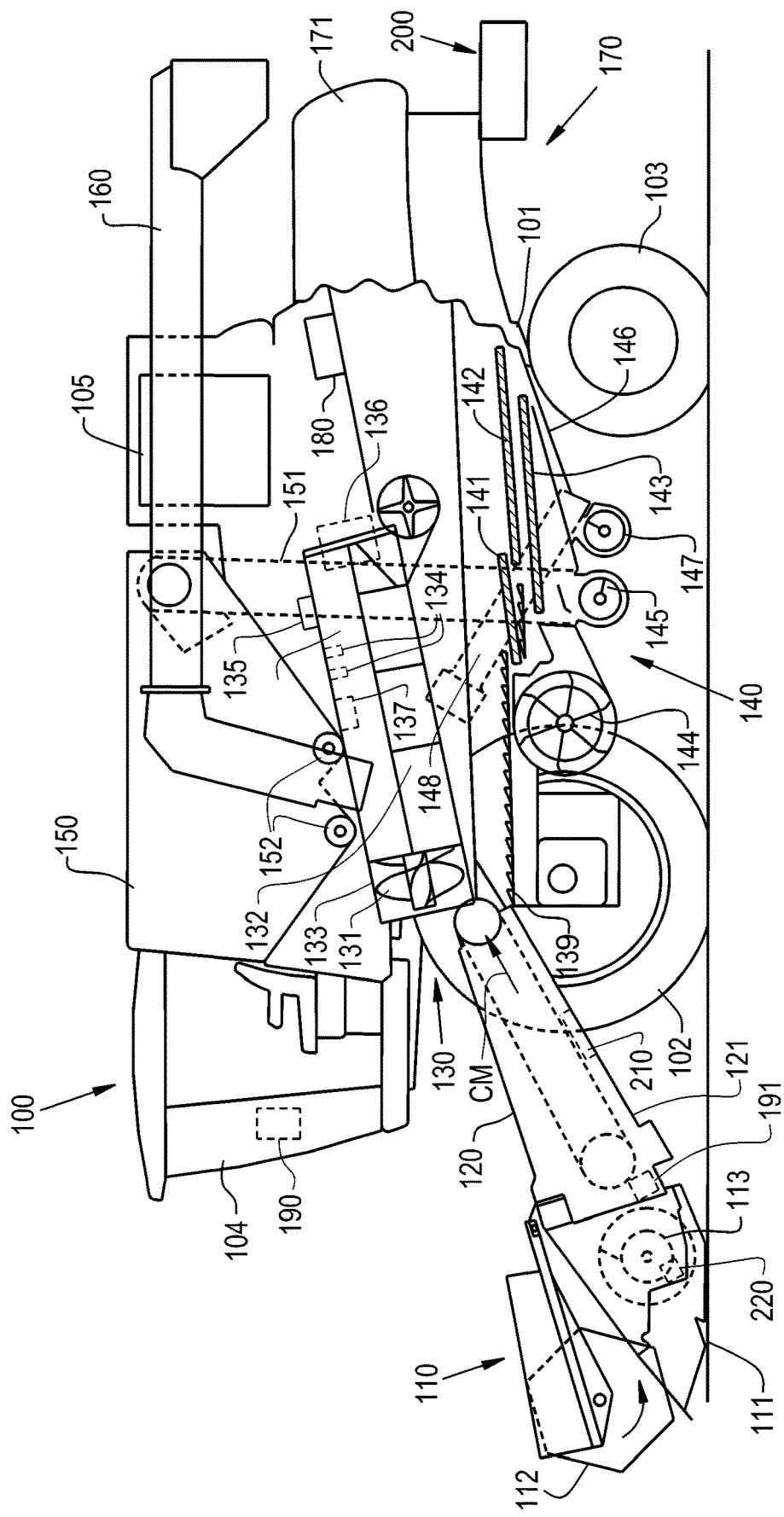
FIG. 1 illustrates a side view of an exemplary embodiment of an agricultural vehicle, the agricultural vehicle comprising a threshing and separation system and a controller, provided according to the present disclosure.

Referring now to the drawings, and more particularly to FIG. 1, there is shown an embodiment of an agricultural harvester 100 in the form of a combine which generally includes a chassis 101, ground engaging wheels 102 and 103, header 110, feeder housing 120, operator cab 104, threshing and separation system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder house 120. Feeder house 120 feeds the cut crop to threshing and separation system 130, and is selectively vertically movable using appropriate actuators, such as hydraulic cylinders (not shown).

Threshing and separation system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separation system 130 can also be a different type of system, such as a system with a transverse rotor rather than an axial rotor, etc. The threshing and separation system 130 is configured to thresh and separate a flow of crop material, indicated by arrow CM, that flows to the threshing and separation system 130 from the feeder house 120.

Grain which has been separated by the threshing and separation system 130 falls onto a grain pan 139 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 139 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

In known combine harvesters, various operating aspects of the harvester are affected by the moisture level of the collected crop material. The threshing and separation system is one of the systems particularly affected by the moisture level of collected crop material because it is where the collected crop material is initially processed to separate the grain from the MOG. Known harvesters determine the moisture level of the collected crop material just prior to entering the grain tank. However, such measurements do not allow changes to be made to various systems of the harvester to assist in handling crop material with varying moisture levels. This can lead to excessive power usage or a slow down in processing because not enough power is provided to, for example, the threshing and separation system.

To address some of the previously described issues, and referring still to FIG. 1, the agricultural harvester 100 includes a controller 190 that is carried by the chassis 101. The controller 190 is configured to operably couple to a moisture sensor, such as a moisture sensor 210 of the feeder house 120 and/or a moisture sensor 220 of the header 110, that is disposed upstream of the threshing and separation system 130, relative to the flow of crop material CM. In other words, the flow of crop material CM headed for the threshing and separation system 130 passes the moisture sensor 210, 220 first. Operably coupling the controller 190 to the moisture sensor 210, 220 allows the controller 190 to determine a moisture level of crop material headed for the threshing and separation system 130 and output an adjustment signal to at least one component of the agricultural harvester 100 to adjust performance of the threshing and separation system 130 based at least partially on the determined moisture level, as will be described further herein.

It should be appreciated that the moisture sensor disposed upstream of the threshing and separation system 130 may be disposed in a variety of places. When the moisture sensor 210 is disposed in the feeder house 120, the moisture sensor 210 may be disposed, for example, on a floor 121 of the feeder house 120. In some embodiments, the moisture sensor 220 disposed upstream of the threshing and separation system 130 is a part of the header 110. Since many headers are removably mountable, the controller 190 may be configured to operably couple to a moisture sensor directly or indirectly via a connection interface. The controller 190 may be, for example, part of an ISOBUS system of the harvester 100 that couples to a connector of the moisture sensor 210, 220 to operably couple the moisture sensor 210, 220 to the controller 190. It should thus be appreciated that, in certain embodiments, the controller 190 is configured to operably couple to a moisture sensor disposed upstream of the threshing and separation system 130, such as the moisture sensor 220 of the header 110, but is not operably coupled to the moisture sensor 220 until the header 110 is installed on the harvester 100. In some embodiments, the controller 190 is configured to operably couple, or is operably coupled, to multiple moisture sensors 210, 220 to determine moisture levels of crop material headed for the threshing and separation system 130 at multiple locations within the harvester 100.

The adjustment signal may be output by the controller 190 to a variety of different components of the harvester 100 to adjust performance of the threshing and separation system 130. It should be appreciated that the following examples illustrate how the controller 190 may output the adjustment signal to a few different components of the harvester 100 in order to adjust the performance of the threshing and separation system 130, but is not exhaustive, i.e., the adjustment signal may be output to adjust performance of the threshing and separation system 130 in other ways.

In some embodiments, the threshing and separation system 130 includes a rotor cage 133 with one or more adjustable vanes 134 disposed on an interior of the rotor cage 133. As is known, vanes 134 of the rotor cage 133 help direct crop material toward a rear of the rotor 131 during rotation of the rotor 131. The adjustable vanes 134 may be coupled to one or more vane actuators 135 that are configured to adjust a vane pitch of the adjustable vane(s) 134, as is known. The controller 190 may be operably coupled to the vane actuator(s) 135 and configured to output the adjustment signal to the vane actuator(s) 135 to adjust the vane pitch of the adjustable vane(s) 134 based at least partially on the determined moisture level and adjust performance of the threshing and separation system 130.

For example, the controller 190 may be configured to determine the moisture level and output the adjustment signal to the vane actuator(s) 135 to adjust the vane pitch of one or more adjustable vanes 134 to a defined value for the determined moisture level of crop material headed for the threshing and separation system 130. At higher determined moisture levels of the crop material, the adjustment signal may cause the vane actuator(s) 135 to adjust the vane pitch of the adjustable vane(s) 134 to promote faster travel of the crop material through the rotor cage 133. Similarly, at lower determined moisture levels of the crop material, the adjustment signal may cause the vane actuator(s) 135 to adjust the vane pitch of the adjustable vane(s) to promote slower travel of the crop material through the rotor cage 133. In either case, the vane pitch can be adjusted prior to the wet or dry crop material reaching the threshing and separation system 130 so the crop material is processed by the threshing and separation system 130 in a manner that promotes an efficient combination of throughput, grain savings, and power consumption. In some embodiments, the controller 190 is configured to determine the moisture level as an average moisture level, rather than an instantaneous moisture level, and outputs the adjustment signal based on the determined average moisture level.

In some embodiments, the threshing and separation system 130 includes a rotor drive 136 that is operably coupled to the rotor 131 and the controller 190 and configured to rotate the rotor 131 at a rotational speed. The rotor drive 136 may be, for example, an adjustable motor or linkage that transmits rotational energy to the rotor 131 in order to rotate the rotor 131 at varying rotational speeds. The controller 190 may be configured to output the adjustment signal to the rotor drive 136 to adjust the rotational speed of the rotor 131 based at least partially on the determined moisture level and adjust performance of the threshing and separation system 130. For example, it is known that wet crop material has a higher mass that requires additional power to move. The higher mass of wet crop material can also significantly slow down the rotational speed of the rotor 131 if the rotor 131 does not have a high enough momentum to initially move the wet crop material. Thus, in some embodiments, the adjustment signal output by the controller 190 to the rotor drive 136 may cause the rotor drive 136 to rotate the rotor 131 at a defined rotational speed for the determined moisture level of crop material headed for the threshing and separation system 130, e.g., at higher determined moisture levels, the rotor drive 136 may rotate the rotor 131 at increased rotational speeds to account for the increased mass of the wet crop. When the controller 190 determines that the moisture level of crop material headed for the threshing and separation system 130 decreases, the controller 190 can output the adjustment signal to the rotor drive 136 to rotate the rotor 131 at decreased rotational speeds to avoid excess power consumption and/or grain damage that may occur due to needlessly rotating the rotor 131, and thus the relatively dry crop material, at higher speeds. In either case, the rotational speed of the rotor 131 can be adjusted prior to the wet or dry crop material reaching the threshing and separation system 130 so the crop material is processed by the threshing and separation system 130 in a manner that promotes an efficient combination of throughput, grain savings, and power consumption.

In some embodiments, the threshing and separation system 130 includes at least one actuator 137 that is operably coupled to the rotor 131 and/or the concave 132. As is known, the rotor 131 and the concave 132 define a clearance therebetween, which can control the aggressiveness of threshing and separation. The actuator(s) 137 may be operably coupled to the controller 190 and the controller 190 may be configured to output the adjustment signal to the at least one actuator 137 to adjust the clearance between the rotor 131 and the concave 132 based at least partially on the determined moisture level and adjust performance of the threshing and separation system 130. For example, when the determined moisture level of crop material headed for the threshing and separation system 130 is higher, the controller 190 may be configured to output the adjustment signal to the at least one actuator 137 to increase the clearance between the rotor 131 and the concave 132, decreasing the power requirements. Similarly, when the determined moisture level of crop material headed for the threshing and separation system 130 is lower, the controller 190 may be configured to output the adjustment signal to the at least one actuator 137 to decrease the clearance between the rotor 131 and the concave 132, which generally increases power consumption but can also provide a more complete thresh and separation for dry crop material. Thus, it should be appreciated that the controller 190 may be configured to adjust the clearance between the rotor 131 and the concave 132 in a variety of ways, depending on the moisture level of the crop material.

In some embodiments, the controller 190 is operatively coupled to the engine 105. The controller 190 may be configured to output the adjustment signal to the engine 105 to adjust a power output based at least partially on the determined moisture level and adjust performance of the threshing and separation system 130. For example, the controller 190 may be configured to output an adjustment signal to the engine 105 that causes the engine 105 to increase power output when the controller 190 determines that wet crop material is headed for the threshing and separation system 130. Since wet crop material generally requires greater amounts of power to process, the engine 105 increasing the power output, which can then be made available to the threshing and separation system 130, prior to wet crop material reaching the threshing and separation system 130 ensures that the threshing and separation system 130 has adequate power available to efficiently thresh and separate the wet crop material. After the controller 190 determines that the moisture level of crop material headed for the threshing and separation system 130 has decreased, the controller 190 can output another adjustment signal to the engine 105 to reduce the power output to avoid wasting fuel by providing excess power that will not be used by the harvester 100. Thus, the controller 190 can adjust the power output of the engine 105, depending on moisture levels of the crop material headed for the threshing and separation system 130, to provide efficient combinations of throughput and power consumption.

It should be appreciated that the controller 190 may be configured to output an adjustment signal to multiple component of the harvester 100 to adjust performance of the threshing and separation system 130. For example, the controller 190 may be configured to output a respective adjustment signal to the vane actuator 135 and the engine 105 to adjust performance of the threshing and separation system 130. The controller 190 may also output other combinations of adjustment signals to respective components, depending on how performance of the threshing and separation system 130 is to be adjusted. Thus, the controller 190 provided according to the present disclosure can adjust performance of the threshing and separation system 130 in a wide variety of ways.

In some embodiments, the harvester 100 further includes a crop intake sensor 191 disposed upstream of the threshing and separation system 130, relative to the flow of crop material CM. The controller 190 may be configured to determine an amount of crop material headed for the threshing and separation system 130 via the crop intake sensor 191 so the controller 190 not only determines the moisture level of crop material headed for the threshing and separation system 130, but also the amount of crop material headed for the threshing and separation system 130. The controller 190 may thus also determine the appropriate adjustment(s) to make by taking the amount of crop material headed for the threshing and separation system 130 into account. In some embodiments, the controller 190 may be configured to determine what component(s) of the harvester 100 to output the adjustment signal to and what adjustment(s) should be made based on the moisture level of the crop material headed for the threshing and separation system 130 and determine a magnitude of the adjustment(s) based on the amount of crop material headed for the threshing and separation system 130. It should thus be appreciated that the controller 190 can be configured to output the adjustment signal based on a variety of parameters of the crop material headed for the threshing and separation system 130.

From the foregoing, it should be appreciated that the controller 190 provided according to the present disclosure allows adjustment of one or more components of the harvester 100 to proactively adjust performance of the threshing and separation system 130. Proactive adjustment of the performance of the threshing and separation system 130 can improve throughput, grain savings, and power consumption by adjusting the performance of the threshing and separation system 130 to handle crop material that is heading toward the system 130. This is in contrast to known systems, which do not measure crop material moisture to adjust the performance of the threshing and separation system 130. In this respect, the controller 190 provided according to the present disclosure can adjust the harvester 100 to best process collected crop material before the collected crop material reaches the first major area of processing, i.e., the threshing and separation system 130. Thus, the harvester 100 with the controller 190 provided according to the present disclosure is well-suited to automatically account for different harvesting conditions and improve harvesting and power consumption efficiency.

Figure 2:
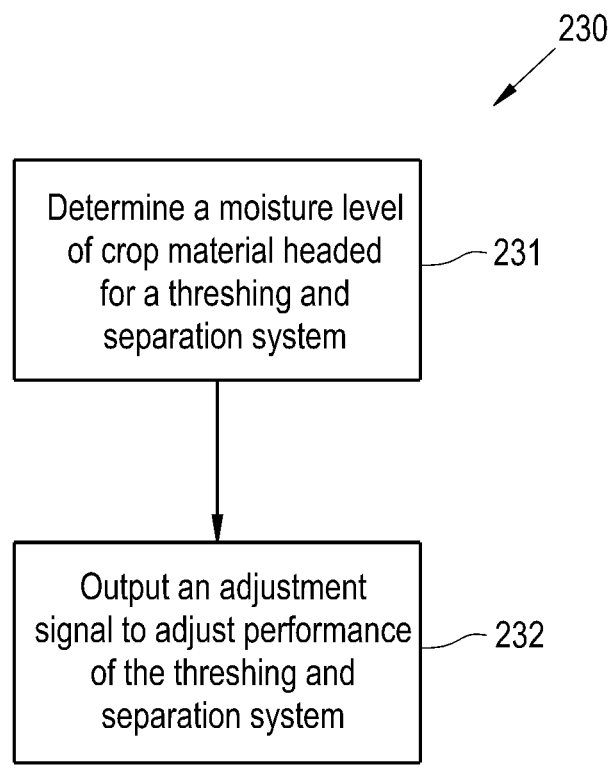
FIG. 2 is a flow chart illustrating an exemplary embodiment of a method of adjusting threshing and separation performance of a threshing and separation system, provided according to the present disclosure.

In some exemplary embodiments, and referring now to FIG. 2, a method 230 of adjusting threshing and separation performance of a threshing and separation system 130 of an agricultural harvester 100 is provided according to the present disclosure. The method is performed by a controller 190 coupled to a moisture sensor 210, 220 and includes determining 231 a moisture level of crop material headed for the threshing and separation system 130. The controller 190 outputs 232 an adjustment signal to at least one component of the agricultural harvester 100 to adjust performance of the threshing and separation system 130 based at least partially on the determined moisture level. In some embodiments, the harvester 100 includes a feeder house 120 with the moisture sensor 210 disposed therein, e.g., on a floor 121 of the feeder house. Alternatively, or in addition, the harvester 100 includes a header 110 with the moisture sensor 220.

In some embodiments, the output adjustment signal adjusts a vane pitch of at least one adjustable vane 134 on an interior of a rotor cage 134. The adjustment signal may be output, for example, to a vane actuator 135 that is coupled to the adjustable vane(s) 134 and configured to adjust the vane pitch of the adjustable vane 134, as previously described. In some embodiments, the output adjustment signal adjusts a rotational speed of a rotor 131. The adjustment signal may be output, for example, to a rotor drive 136 that is configured to rotate the rotor 131 at the rotational speed, as previously described. In some embodiments, the output adjustment signal adjusts a clearance between the rotor 131 and a concave 132. The adjustment signal may be output, for example, to an actuator 137 that is coupled to the rotor 131 and/or the concave 132 and configured to adjust the clearance between the rotor 131 and the concave 132, as previously described. In some embodiments, the output adjustment signal adjusts a power output of an engine 105 of the harvester 100, as previously described. It should thus be appreciated that outputting 232 the adjustment signal may adjust performance of the threshing and separation system 130 in a wide variety of ways.

It is to be understood that the steps of the method 230 are performed by the controller 190 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 190 described herein, such as the method 230, is implemented in software code or instructions which are tangibly stored on a tangible computer readable medium. The controller 190 loads the software code or instructions via a direct interface with the computer readable medium or via a wired and/or wireless network. Upon loading and executing such software code or instructions by the controller 190, the controller 190 may perform any of the functionality of the controller 190 described herein, including any steps of the method 230 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural harvester, comprising:
   a chassis;
   an engine carried by the chassis;
   a threshing and separation system comprising at least one concave carried by the chassis, a rotor cage, and a rotor enclosed by the rotor cage, the threshing and separation system being configured to thresh and separate a flow of crop material; and
   a controller carried by the chassis and configured to:
      operably couple to a moisture sensor disposed upstream of the threshing and separation system, relative to the flow of crop material;
      determine a moisture level of crop material headed for the threshing and separation system; and
      output an adjustment signal to at least one component of the agricultural harvester to adjust performance of the threshing and separation system based at least partially on the determined moisture level, the at least one component including the engine which is operatively coupled to the controller, the controller being configured to output the adjustment signal to the engine to increase a power output of the engine when the determined moisture level increases, and decrease the power output of the engine when the determined moisture level decreases, and
      wherein the threshing and separation system further comprising at least one adjustable vane disposed on an interior of the rotor cage and a vane actuator operably coupled to the at least one adjustable vane and the controller, the controller being configured to output the adjustment signal to the vane actuator to adjust a vane pitch of the at least one adjustable vane to promote faster travel of crop material through the rotor cage when the determined moisture level increases, and adjust the vane pitch of the at least one adjustable vane to promote slower travel of crop material through the rotor cage when the determined moisture level decreases.

2. The harvester of claim 1, further comprising a feeder house carried by the chassis and configured to feed the flow of crop material to the threshing and separation system, the feeder house comprising the moisture sensor disposed therein.

3. The harvester of claim 2, wherein the moisture sensor is disposed on a floor of the feeder house.

4. The harvester of claim 1, further comprising a header carried by the chassis and configured to cut crop material from a field, the header comprising the moisture sensor.

5. The harvester of claim 1, wherein the threshing and separation system comprises a rotor drive operably coupled to the rotor and the controller and configured to rotate the rotor at a rotational speed, the controller being configured to output the adjustment signal to the rotor drive to adjust the rotational speed of the rotor based at least partially on the determined moisture level.

6. The harvester of claim 1, wherein the threshing and separation system comprises at least one actuator operably coupled to at least one of the rotor or the concave and the controller, the controller being configured to output the adjustment signal to the at least one actuator to adjust a clearance between the rotor and the concave based at least partially on the determined moisture level.

7. A method of adjusting threshing and separation performance of a threshing and separation system of an agricultural harvester, the threshing and separation system comprising a rotor cage, a rotor enclosed by the rotor cage, and at least one adjustable vane disposed on an interior of the rotor cage, and a vane actuator operably coupled to the at least one adjustable vane, the method being performed by a controller operably coupled to a moisture sensor and the vane actuator and comprising:
   determining a moisture level of crop material headed for the threshing and separation system; and
   outputting an adjustment signal to at least one component of the agricultural harvester to adjust performance of the threshing and separation system based at least partially on the determined moisture level, wherein the agricultural harvester includes an engine operatively coupled to the controller, the at least one component including the engine, the adjustment signal outputted by the controller causing the engine to increase a power output of the engine when the determined moisture level increases, and decrease the power output of the engine when the determined moisture level decreases, wherein the output adjustment signal adjusts a vane pitch of the at least one adjustable vane to promote faster travel of crop material through the rotor cage when the determined moisture level increases, and the output adjustment signal adjusts the vane pitch of the at least one adjustable vane to promote slower travel of crop material through the rotor cage when the determined moisture level decreases.

8. The method of claim 7, wherein the agricultural harvester comprises a feeder house configured to feed the flow of crop material to the threshing and separation system, the feeder house comprising the moisture sensor disposed therein.

9. The method of claim 8, wherein the moisture sensor is disposed on a floor of the feeder house.

10. The method of claim 7, wherein the agricultural harvester comprises a header configured to cut crop material from a field, the header comprising the moisture sensor.

11. The method of claim 7, wherein the threshing and separation system comprises a rotor drive operably coupled to the rotor and the controller and configured to rotate the rotor at a rotational speed, wherein the output adjustment signal adjusts the rotational speed of the rotor.

12. The method of claim 7, wherein the threshing and separation system comprises at least one actuator operably coupled to at least one of the rotor or the concave and the controller, wherein the output adjustment signal causes the at least one actuator to adjust a clearance between the rotor and the concave.

13. A system of adjusting threshing and separation performance of a threshing and separation system of an agricultural harvester, the system comprising:
   at least one concave carried by a chassis of the agricultural harvester;
   a rotor cage, and a rotor enclosed by the rotor cage; and
   a controller carried by the chassis and configured to:
      operably couple to a moisture sensor disposed upstream of the threshing and separation system, relative to the flow of crop material;
      determine a moisture level of crop material headed for the threshing and separation system; and
      output an adjustment signal to at least one component of the agricultural harvester to adjust performance of the threshing and separation system based at least partially on the determined moisture level, the at least one component including the engine which is operatively coupled to the controller, the controller being configured to output the adjustment signal to the engine to increase a power output of the engine when the determined moisture level increases and decrease the power output of the engine when the determined moisture level decreases, and
   wherein the threshing and separation system further comprising at least one adjustable vane disposed on an interior of the rotor cage and a vane actuator operably coupled to the at least one adjustable vane and the controller, the controller being configured to output the adjustment signal to the vane actuator to adjust a vane pitch of the at least one adjustable vane to promote faster travel of crop material through the rotor cage when the determined moisture level increases, and adjust the vane pitch of the at least one adjustable vane to promote slower travel of crop material through the rotor cage when the determined moisture level decreases.

\* \* \* \* \*